Sept. 9, 1930.                C. BIRDSEYE                 1,775,549
                    METHOD OF PACKAGING FRUIT JUICES
                      Filed Nov. 2, 1929    2 Sheets-Sheet 1

INVENTOR
Clarence Birdseye.

Sept. 9, 1930.  C. BIRDSEYE  1,775,549
METHOD OF PACKAGING FRUIT JUICES
Filed Nov. 2, 1929  2 Sheets-Sheet 2

INVENTOR
Clarence Birdseye.
by H. W. Kenway. Atty

Patented Sept. 9, 1930

1,775,549

UNITED STATES PATENT OFFICE

CLARENCE BIRDSEYE, OF GLOUCESTER, MASSACHUSETTS, ASSIGNOR TO FROSTED FOODS COMPANY, INC., OF DOVER, DELAWARE, A CORPORATION OF DELAWARE

METHOD OF PACKAGING FRUIT JUICES

Application filed November 2, 1929. Serial No. 404,380.

This invention relates to an improved method of packaging fruit juices for distribution to the consumer.

An important field of use of the invention is in packaging the fresh juice of oranges or other citrus fruit, and the invention will be disclosed in its application to that product. The problem of preserving fresh fruit juice without deterioration in flavor or composition, so that it may be kept in storage and shipped and distributed under commercial conditions, presents many difficulties. In the first place, the fresh juices, upon being separated from the fruit, almost immediately begin to undergo change of flavor and deterioration due to bacteriological action, decomposition, oxidation, and other chemical or fermentive processes. In the second place, fresh fruit juices undergo mechanical changes in composition due to coagulation, separation, and breaking down of the emulsion in which various ingredients are suspended, and this mechanical deterioration is often hastened or intensified by the preservative processes to which the fresh juice is subjected. For example, in slow freezing orange juice the pure water content tends to separate in the form of ice crystals which enclose an increasingly concentrated juice as the freezing continues.

I have discovered that fruit juices, and particularly fresh citrus fruit juices, may be preserved with all their natural flavor and without change in composition by freezing with sufficient rapidity to avoid such separation as that suggested. When the rate of freezing is sufficiently expedited, the fruit juice is congealed in its natural homogeneous condition with the solid ingredients suspended in a uniform dispersion instead of undergoing any process of separation. Bacteriological and decomposition changes are also immediately arrested and substantially prevented.

In the treatment of fresh fruit juices, it is important, for reasons already outlined, to reduce to a minimum the time during which the juice, either as liquid or in a frozen condition, is exposed to contact with the atmosphere. My invention, accordingly, contemplates a method in accordance with which the juice may be partially enclosed and protected at an early stage and in which the protection is maintained during the freezing step while the liquid juice is being converted to a frozen cake. This I accomplish by enclosing a unit quantity of fresh juice within a container of moisture and vapor-proof material, freezing the enclosed juice by engaging opposite faces of the container between heat conductive members, and then sealing the container upon the cake without exposing the latter to the atmosphere, thus completely protecting the cake. Important advantages from the standpoint of economy of production are thus secured in that the container employed for holding and shaping the juice in the freezing step is also utilized as the protecting and shipping packing for the product.

One desirable manner of carrying out my invention consists in placing the fruit juice in a bag or other enclosure of flexible moisture-proof material, supporting the enclosure so that it will, under the fluid pressure of the fruit juice, assume the shape desired in the product, and freezing the fruit juice while thus enclosed to form a partially wrapped solid cake. The exposed area of the frozen product is thus reduced to a minimum and the cake may be completely wrapped without exposing the body thereof at any time to the atmosphere. An important advantage incident to the steps above outlined is that the bag or enclosure for the fruit juice may be placed in and supported by a mold of heat-conductive material and so presented with its contained fruit juice to the action of any refrigerating medium as, for example, by being immersed in brine at a temperature sufficiently low to quick freeze the contents.

These and other features of the invention will be best understood and appreciated from the following description of several ways of carrying it out, selected for purposes of illustration and shown in the accompanying drawings, in which Fig. 1 is a sectional view of a filled mold-supported bag;

In carrying out the method of my invention as illustrated in Figs. 1 to 5, I preferably employ a bag 10 of such material as cellophane, which is a thin, transparent, moisture and vapor-proof material. This material is well adapted to the requirements of the case as it is extremely flexible, fairly tough in texture and a good conductor of heat. In process of manufacture, the bag is formed with a square sealed bottom so that it presents a water-proof container for the fruit juice. The bag 10 is placed within a mold 12 which may be of thin sheet metal and, therefore, highly heat conductive. The bag projects slightly above the top of the mold and when filled with fruit juice is caused, by the fluid pressure of the latter, to conform accurately to the inner walls of the mold, taking its shape therefrom, making intimate contact therewith, and eliminating air pockets which, if present, would retard the flow of heat. Preferably the mold-supported bag is filled with fruit juice to a point slightly below the top of the mold in order to allow space for expansion of its contents in the quick freezing step.

Figure 1:
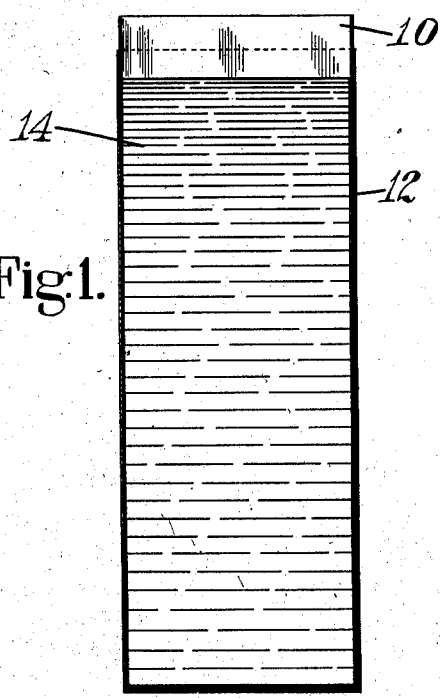
Figure 2:
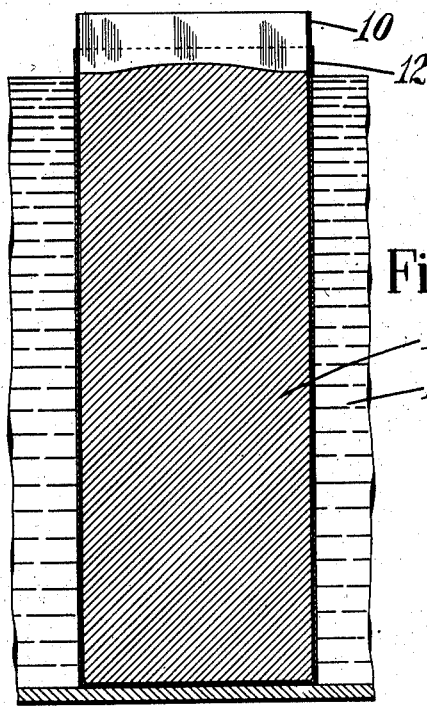
Fig. 2 is a similar view showing the mold-supported bag immersed in brine and the contents frozen.

The filled mold-supported bag is next immersed in a liquid refrigerating medium 18, such as calcium chlorine brine, having a temperature approximating −45° F. This step is indicated in Fig. 2, and in it the liquid fruit juice is converted into a cake of ice 16. The mold and bag are herein shown as rectangular in shape and the quick freezing operation, accordingly, progresses simultaneously from both sides of the mold and at a rapid rate. For example, a unit of orange juice 1½" thick may be quick frozen and converted into a solid cake under the conditions outlined in the course of 20 minutes. Since the container is open at its upper end, expansion of the liquid in freezing takes place upwardly and the cake produced is somewhat rounded at its upper end.

Figure 3:
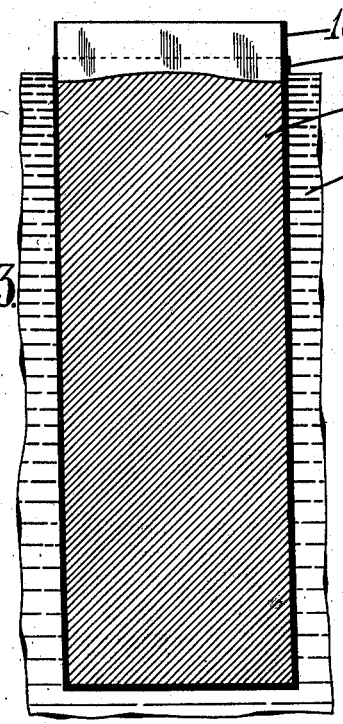
Fig. 3 is a similar view showing the same immersed in water.

In the quick freezing operation it may happen that a slight bond of frost is formed between the outer wall of the bag 10 and the inner wall of the mold 12. It is, accordingly, convenient to free the enclosed quick frozen cake from the mold by a slight melting operation before attempting to remove it. This may be effected, and at the same time the brine washed from the outer surface of the mold so as to avoid all danger of it reaching the product, by immersing the mold for a short time in water 20 at a temperature above the freezing point. This step is indicated in Fig. 3.

Figure 4:
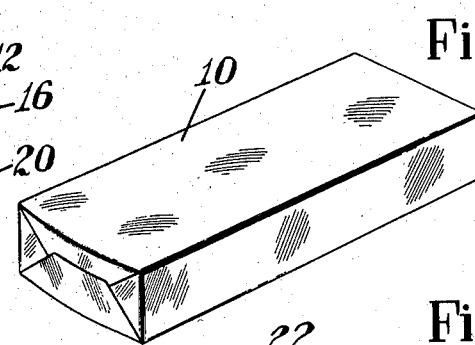
Fig. 4 is a view in perspective of the partially wrapped cake as it comes from the mold.

Having washed the mold and freed the enclosed cake from its sides, the latter is removed in partially wrapped condition, as shown in Fig. 4; that is to say, with the cellophane bag 10 frozen solidly to the sides and bottom of the cake, shielding it effectively from the atmosphere and from incidental oxidation. The cake may be immediately sealed by folding in the projecting ends of the bag 10 and this may be carried out in automatic wrapping machinery or otherwise. The result, however, is a completely sealed, solidly frozen cake of convenient size effectively protected against loss by evaporation and the changes which would result from contact with the atmosphere. On account of the transparent nature of the wrapping, the cake presents an attractive and appetizing appearance.

In order still further to protect the frozen cake and to prepare it for commercial handling, it may be enclosed in an outer wrapper of heavy paper 22, as shown in Fig. 5, and again sealed, as by an adhesive strip 24. The cakes are now ready for shipment and are preferably packed in close contact in shipping cartons. The frozen juice packaged in this manner may be held in cold storage for long periods without deterioration of any kind and may be prepared for consumption at any time by being melted in their inner containers. The frozen product is thus restored to its original liquid condition, retaining its original flavor and other characteristics of the fresh juice unimpaired.

I have described the method of my invention as carried out by employing a container of thin flexible material supported by a mold or the like, but the character of the container may be varied to suit the requirements of the case and a container of stiffer material may be used in connection with a supporting mold or a self-sustaining container, such as a cardboard carton, may be employed without the assistance of a mold.

Figure 5:
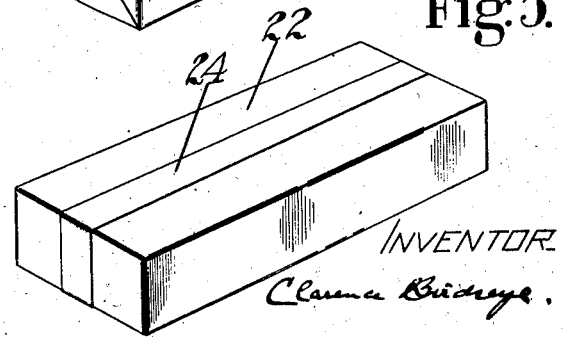
Fig. 5 is a view in perspective of the wrapped and sealed cake.

In the latter case I may employ a carton 30 of cardboard or the like, preferably treated as by paraffin to render it substantially moisture and vapor-proof. The carton 30, herein shown, is an elongated rectangle in shape and relatively narrow in one dimension so as to present opposite flat faces of substantial area. Preferably the carton is fashioned without longitudinal seam and is provided at its ends with end tongues 32 and side flaps 34 creased to form, when folded, substantially water-tight top and bottom. The carton is presented for use with its bottom folded and, if desired, also sealed, thus forming a container for the liquid fruit juice 14, with which it may be filled as indicated in Fig. 5. The carton may be sufficiently stiff in its construction to be self-sustaining and to support without distortion the fluid pressure of its liquid contents.

Figure 6:
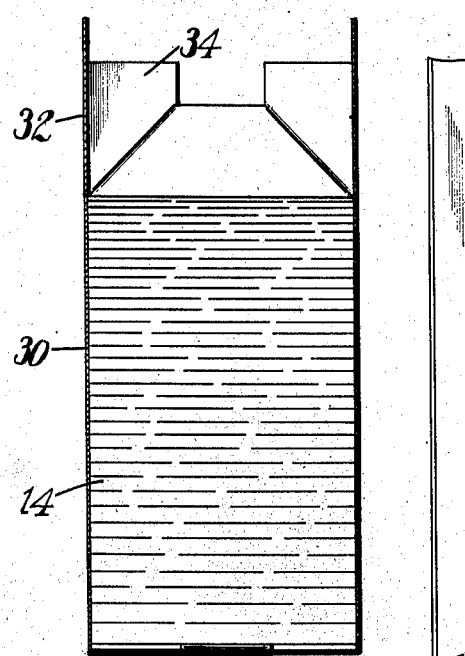
Fig. 6 is a sectional view of a filled self-sustaining carton.
Figure 7:
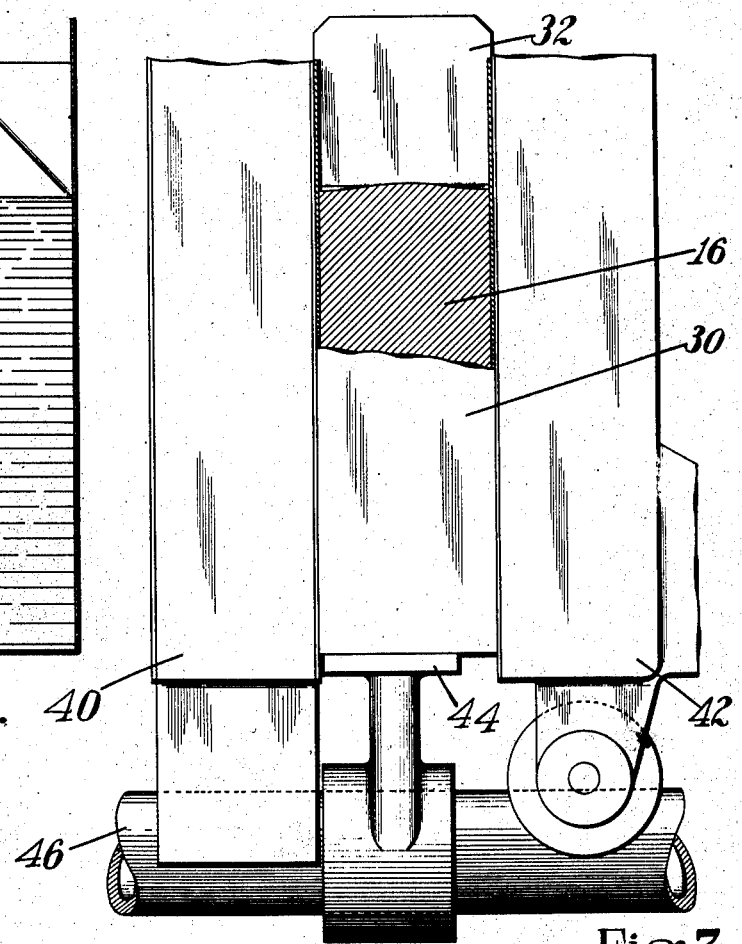
Fig. 7 is a sectional view of the filled carton in position between heat-conductive plates.
Figure 8:
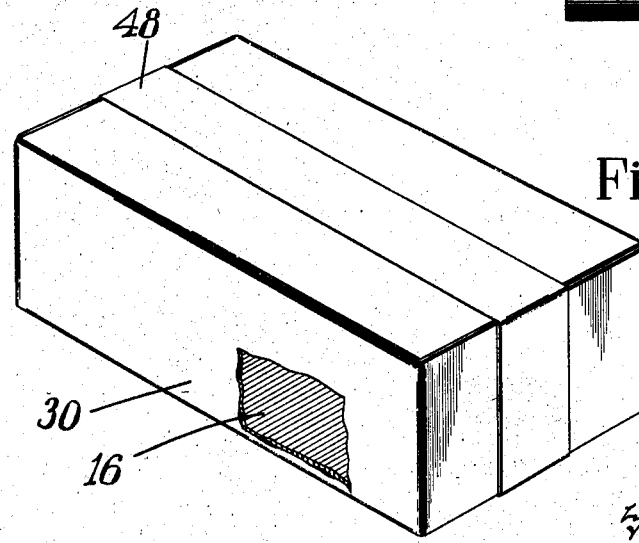
Fig. 8 is a view in perspective of a frozen cake sealed within the carton.

Having filled the carton 30 to a point slightly below the tongue 32 and flaps 34, it may be positioned with its opposite flat faces intimately engaged between vertically disposed heat-conductive members. Any suitable quick freezing apparatus of this type will serve such, for example, as that disclosed in the copending application of B. H. Hall, Serial No. 383,710. This, as shown in Fig. 6, includes a pair of vertically disposed relatively-movable plates 40 and 42, supported upon a horizontally disposed pipe 46 and having connections by which a liquid refrigerating medium, such as calcium chloride brine, may be circulated through them and the heat of an interposed product thus removed. The pipe 46 is provided with a support 44 upon which the filled carton 30 may be placed, and having been thus located the heat-conductive plates 40 and 42 are relatively moved to engage it firmly between them. The liquid fruit juice is thereupon converted by a quick freezing operation to an enclosed cake 16 of frozen juice, expansion thereof taking place in an upward direction and forming a bulge in the upper surface of the cake.

It will be apparent that the conditions present in apparatus of the character illustrated are particularly favorable for the quick freezing operation in that there is no possibility of air being trapped at any point between the product to be frozen and the vertical walls containing it and, moreover, the liquid pressure of the juice tends to maintain the walls of the carton 30 in intimate contact over the entire area of the contacting faces with the vertical faces of the heat-conductive plates.

While the exact degree of temperature of the liquid freezing medium and the length of time required for the freezing step are of secondary importance only, I have found that satisfactory results are secured by employing in the heat-conductive plates calcium chloride brine at a temperature of approximately −45° F. as a refrigerating medium, and under such conditions a carton of fresh fruit juice 1½" thick may be quick frozen, as before, in about 20 minutes.

It will be seen that the carton 30 serves partially to enclose and protect the fruit juice except at its upper surface and this corresponds to the face of the rectangular cake having the smallest superficial area. The walls of the carton not only protect the fresh juice in its liquid form but also during the freezing operation, and the frozen cake 16 produced is also partially protected and in accordance with the method of my invention is never exposed to the atmosphere in the packaging operation except at this relatively small upper surface.

At the conclusion of the quick freezing step the plates 40 and 42 are separated and the carton with its enclosed cake is removed from the apparatus. The cake is then immediately protected by having the end tongues 32 and side flaps 34 of the carton folded as the bottom of the carton has already been folded. This may be effected in automatic wrapping machinery or otherwise, and the result is a sealed, solidly frozen cake of convenient size, effectively protected against loss by evaporation and oxidation which would result from contact with the atmosphere. Preferably the closed carton is sealed by an adhesive strip 48 and the package is now ready for shipment. These may be packed in close contact in shipping cartons and may be held in cold storage for long periods without deterioration of any kind or loss by evaporation.

My invention has been described for purposes of illustration as including a quick freezing step and for several reasons it is desirable that the juice should be so frozen. This is not essential, however, and my invention may be practiced successfully whenever the freezing step is carried out with sufficient rapidity to avoid a substantial separation of the water content from the other constituents of the juice.

Having thus described my invention, what I claim as new and desire to secure by Letters Patent of the United States is:

1. The method of packaging fruit juices, which consists in filling a mold-supported bag of moisture-proof flexible material with fresh fruit juice, freezing the juice while so enclosed, removing the bag with its frozen contents in the form of a solid cake, and sealing the bag upon said cake.

2. The method of packaging fruit juices, which consists in filling with fresh fruit juice and simultaneously shaping a mold-supported bag of moisture-proof flexible material, freezing the juice while so contained, removing the bag with its frozen contents in the form of a partially enclosed cake, and sealing said cake within the bag to prevent evaporation and oxidization thereof.

3. The method of packaging fruit juices, which consists in supporting a moisture-proof flexible bag within a rigid heat-conductive mold, filling the mold-supported bag with fresh fruit juice and causing it by liquid pressure to conform to the shape of the mold, freezing the juice by engaging the mold with a refrigerating medium, removing the bag with its frozen contents in the form of a cake, and sealing the frozen cake against oxidization within the bag in which it was frozen.

4. The method of packaging fruit juices, which consists in lining a heat-conductive mold with flexible moisture-proof material, filling the lined mold with fresh fruit juice, freezing the juice while so enclosed, removing the frozen juice with the lining as a partially wrapped frozen cake, sealing the lining to protect the cake against evaporation, and then enclosing the sealed cake within an outer covering.

5. The method of packaging citrus fruit juices, which consists in enclosing the fresh juice in a flexible vapor-proof container open at one end, quick freezing the juice while so enclosed to form a partially wrapped solid cake, and then, without exposing the body of the cake to the atmosphere, sealing the cake by folding the open end of the container upon it.

6. The method of packaging fruit juices, which consists in lining a thin-walled metallic heat-conductive mold with a bag of moisture proof cellophane, filling the lined mold with fresh fruit juice, thereby causing the lining to be pressed into intimate contact with the inner walls of the mold by the liquid pressure therein, quick freezing the juice by immersing the mold and its contents in brine at approximately $-45°$ F., freeing the lining from the inner walls of the mold and simultaneously removing the brine from the outer walls thereof by washing the mold in relatively warm water, removing the lining bag with its contents as a frozen cake, sealing the open end of the bag, and finally wrapping and sealing the cellophane-covered cake of frozen juice.

7. The method of packaging fruit juices, which consists in enclosing the fresh juice in a container of suitable shape, quick freezing the juice while so enclosed, thus forming a partially protected frozen cake, and then completely protecting the cake, employing said container for the purpose.

8. The method of packaging fruit juices, which consists in enclosing the fresh juice in a rectangular container, elongated vertically and having minimum superficial area in its horizontal faces, quick freezing the juice while so enclosed and with its upper surface only exposed, thus forming a frozen cake protected on all faces except one of minimum superficial area, and then completely protecting the cake, employing said container for the purpose.

9. The method of packaging fruit juices, which consists in enclosing the fresh juice in a rectangular self-sustained carton, elongated vertically and having minimum superficial area in its horizontal faces, quick freezing the juice while so enclosed and with its upper surface only exposed, thus forming a frozen cake protected on all faces except one of minimum area, and then covering the exposed face completely to protect the frozen cake, employing said carton for the purpose.

CLARENCE BIRDSEYE.